United States Patent
Kakei

(10) Patent No.: US 8,142,079 B2
(45) Date of Patent: Mar. 27, 2012

(54) LINEAR MOTION GUIDE UNIT WITH MEANS FOR KEEPING CAGE AGAINST WANDERING

(75) Inventor: Shigeki Kakei, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 1186 days.

(21) Appl. No.: 11/703,179

(22) Filed: Feb. 7, 2007

(65) Prior Publication Data

US 2007/0201778 A1 Aug. 30, 2007

(30) Foreign Application Priority Data

Feb. 28, 2006 (JP) .................................. 2006-053403

(51) Int. Cl.
*F16C 19/00* (2006.01)
(52) U.S. Cl. ............................................ 384/51; 384/57
(58) Field of Classification Search ................ 384/47, 384/49, 59, 51, 57; 403/344, 310
See application file for complete search history.

(56) References Cited

U.S. PATENT DOCUMENTS

| | | | |
|---|---|---|---|
| 2,866,505 A | 12/1958 | Forkner | |
| 5,076,715 A | 12/1991 | Saoyama et al. | |
| 5,427,454 A | 6/1995 | Tsuboi | |
| 6,276,830 B1 * | 8/2001 | Edelmann et al. | 384/51 |
| 6,886,983 B2 * | 5/2005 | Tsuboi et al. | 384/51 |
| 6,971,797 B2 * | 12/2005 | Obara et al. | 384/47 |
| 7,240,810 B2 * | 7/2007 | Harrity et al. | 222/464.4 |

FOREIGN PATENT DOCUMENTS

| | | |
|---|---|---|
| DE | 198 15 526 A1 | 10/1999 |
| EP | 1 277 976 A2 | 1/2003 |
| EP | 1 431 601 A2 | 6/2004 |
| JP | 60-4618 A | 1/1985 |
| JP | H07-91445 | 4/1995 |
| JP | 2003-28157 | 1/2003 |
| JP | 2004-197850 | 7/2004 |

OTHER PUBLICATIONS

Extended European Search Report dated Mar. 12, 2009.

* cited by examiner

*Primary Examiner* — Thomas R Hannon
*Assistant Examiner* — Alan Waits
(74) *Attorney, Agent, or Firm* — Browdy and Neimark, PLLC

(57) ABSTRACT

A liner motion guide unit has a means to keep a cage against wandering, in which a pinion is made up of holder halves that are adapted to squeeze each other against the cage to make sure of keeping a pinion in place with accuracy. The means for keeping the cage against wandering is comprised of a pinion holder fitting into a window cut in the cage, racks lying on sides of the guideway members, one to each side, and a pinion provided with teeth mating with the racks and installed in the cage for rotation. The pinion holder is made up of holder halves, any one of which lies on any one side of the cage at a marginal edge of the cage at the same marginal edge of the window. The holder halves have sidewise extensions to firmly squeeze the cage between them along the marginal edge of the window.

6 Claims, 8 Drawing Sheets

LINEAR MOTION GUIDE UNIT WITH MEANS FOR KEEPING CAGE AGAINST WANDERING

FIELD OF THE INVENTION

The present invention relates generally to a linear motion guide unit of the type hereinafter referred to as "finite linear motion guide units" because of their construction where a pair of lengthwise guideway members lies movable relatively to one another by virtue of more than one rolling element retained in a cage to roll between the guideway members and, more particular, to a finite linear motion guide unit that is provided therein with means for keeping a cage against wandering.

BACKGROUND OF THE INVENTION

Current finite linear motion guide units of the sort recited just above have been used extensively in diverse fields of machinery such as semiconductor manufacturing machines, which are seeing growing demands for high working performance including high-speed operation, high acceleration/deceleration, highly slim in construction, high accuracy and low resistance in sliding movement, and so on. Most of the finite linear motion guide units with means for keeping the cage against wandering have been conventionally models for small-sized machines. Nevertheless, modern industries are in need of larger versions of the finite linear motion guide units of the same type to be suited for large-sized machines.

In the commonly assigned Japanese Patent Laid-Open No. 2004-197850, there is disclosed a finite linear motion guide unit in which the cage with hook hole lies between the guideway members while the pinion holder is inserted into the hook hole in the cage after once having been made deformed in itself, and then released from the deforming stress to fit into the hook hole to come into engagement with the cage. Next, the pinion shaft is forced into the bearing recess in the pinion holder to carry the pinion for rotation. With the finite linear motion guide unit constructed as stated earlier, the cage lying between the guideway members to space the rolling elements from each other is installed therein with the pinion holder, which fits into the hook hole in the cage in a simple snap-fit manner to provide the tiny construction to keep the cage against wandering. To this end, the pinion holder has a flange extending out of any side of the pinion holder so as to come into abutment against any one surface of an edge around the hook hole, and an snap hook extending out of the other side of the pinion holder to come into engagement with another surface of the edge around the hook hole.

Another finite linear motion guide unit is disclosed in the commonly assigned Japanese Patent Laid-Open No. 2003-28157, in which the rack-and-pinion arrangement is interposed between paired guide rails to keep a cage retaining more than one rolling element therein against falling off from the guide rails. The pinion holder is installed closely in the aperture in the cage and further fastened to the cage in a way some pins on the flange portion of the pinion holder are forcibly pushed into the holes of the cage, and then caulked at their opposite ends by any suitable tool. The pinion is held in the pinion holder, with the pinion shaft being carried for rotation in bearing areas in the pinion holder.

A further another commonly assigned Japanese Patent Laid-Open No. H07-91445 disclosed a finite linear motion guide unit that is envisaged realizing positive control of the relative travel of the guideway members. With the finite linear motion guide unit recited just earlier, the guideway members are arranged in parallel with one another in such a geometric relation that their raceway grooves are in opposition to each other while the racks are placed in the relief valleys cut deep in the raceway grooves. Between the confronting guideway grooves, there are placed all the cylindrical rollers and the pinion that comes into mesh with the rack. With the finite linear motion guide unit stated just above, the pinion is held for rotation between the upper and lower pinion holder portions, whose shapes are triangular in transverse section. Upon installation of the pinion into the cage, the upward top of the upper pinion holder portion is first fit into the V-notch cut in the edge bordering around the aperture in the cage and then the downward bottom of the lower pinion holder portion is forcibly snapped into the V-notch in the edge bordering around the aperture in the cage while getting the edge deformed elastically.

The finite linear motion guide unit disclosed in the Japanese Patent Laid-Open No. 2004-197850 recited earlier, although but well suited for the small construction in size, is not ready for large construction because the pinion holder is inevitably rendered too large in size to make the pinion holder for itself deformable. With the finite linear motion guide unit made large in construction, moreover, as the effort exerted on the pinion to keep the cage against wandering could become large, there are still issues to be worked out in, especially, appliances that need to securely bear the pinion in the pinion holder.

With the finite linear motion guide unit disclosed in the Japanese Patent Laid-Open No. 2003-28157, the installation of the pinion holder in the cage needs a plurality of pins and, therefore, several chores in assembly and in working of the parts or components. The prior finite linear motion guide unit, when adapted for the large machines, needs to consider that it takes more force loaded on the pinion to keep the cage against wandering. Thus, there are still issues to be worked out in, especially, appliances that need to securely bear the pinion in the pinion holder.

With any of the prior finite linear motion guide units recited earlier, as the pinion holder is retained in place by just any mating edges of the cage, the pinion holder has to be firmly secured to the cage in preparation for their applications to the large machines. The prior finite linear motion guide units, when designed for the large machines, needs to consider that it takes more force loaded on the pinion to keep the cage against wandering. Thus, there are still issues to be worked out in, especially, appliances that need to securely bear the pinion in the pinion holder.

SUMMARY OF THE INVENTION

The present invention, therefore, has as its primary object to overcome the major issues discussed earlier in the finite linear motion guide units with means to keep in place a cage against wandering and, in particular to provide a finite linear motion guide unit with means for keeping a cage against any wandering, which is adapted for use in larger machines than once expected. More particular, the present invention is envisaged the provision of a finite linear motion guide unit with means to protect a cage against wandering, in which a pinion holder to receive therein a pinion for revolution is composed of a pair of pinion holder halves, which are fastened together in a snap-fit joining manner to render the pinion holder increased in mechanical strength to the extent making it possible to utilize the pinion holder in large machines. Moreover, the linear motion guide unit with means to keep the cage against any wandering of the present invention helps lessen required parts in number, becoming simple in construction, making the pinion holder parts same in shape to be made at low unit costs, making the pinion holder easier in assembly, rendering the linear motion guide unit itself versatile in applications with even compact in construction, allowing the cage to be made into flat shape to permit cutting the windows to fit over the pinion holder at any desired locations, and making it possible to apply the cage everywhere, even any location there is no guideway groove confronting the counterpart.

The present invention is concerned with a linear motion guide unit comprising a pair of guideway members lying movable relatively to one another and having confronting raceway grooves on their sides extending in lengthwise direction, a cage made of a cage plate extending the lengthwise direction to retain more than one rolling element in a raceway defined between the raceway grooves on the guideway members, the cage being provided therein with a means for keeping the cage against wandering; wherein the means for keeping the cage against wandering is comprised of a pinion holder fitting into a window cut in the cage, racks lying on the guideway members, one to each guideway member, and a pinion provided with teeth mating with the racks and installed in the cage for rotation; and wherein the pinion holder is made up of a first holder half part and a second holder half part, both of which have sidewise extensions coming into mating with the cage plate on opposite sides to squeeze edges of the cage plate around the window between them to keep the pinion holder on the cage plate.

In an aspect of the present invention, a linear motion guide unit is disclosed in which the racks are installed in the lengthwise sides of the guideway members, one to each side, and the first holder half part is placed on any one side of the cage plate while the second holder half part is placed on the other side of the cage plate.

In another aspect of the present invention, a linear motion guide unit is disclosed in which the first and second holder half parts are snapped engaged together in opposition to each other to complete the pinion holder. In a further another aspect of the present invention, the first and second halves have each latches and recesses so that any one latch of any one half part is allowed to snap into the corresponding recess of another half part to make snap-fit between the holder halves, finishing the pinion holder. Moreover, the first and second holder halves are made identical in shape, but combined together in lengthwise opposite direction to one another.

In another aspect of the present invention, there is disclosed a linear motion guide unit in which the first and second holder halves have each an opening of rectangular shape to fit the pinion therein. In another aspect of the present invention, there is further disclosed a linear motion guide unit in which the pinion has a pinion shaft that is carried for rotation in bearing portions recessed in the first and second holder halves. In a further aspect of the present invention, the first and second holder halves are each made with a raised portion of a contour adapted to fit snugly into the window cut in the cage plate. Moreover, any one of the first and second holder halves has a locating pin while the other has a hole adapted to fit over the locating pin.

With the linear motion guide unit constructed as stated-earlier, the pinion holder can fit into the cage plate without subjected to any deformation to fix securely the pinion holder in the cage plate. The pinion holder is made up of the holder halves that are made to squeeze the cage plate with carrying the pinion shaft for rotation between them holder halves, thereby serving to combine firmly the pinion holder with the cage plate. Snap-fit joining the holder halves together with one another in the pinion holder on the cage plate, as unnecessary to use any dedicated tool to combine and/or dismantle the pinion holder of the cage plate, helps make the working steps less in number and the working fashions more versatile. Moreover, the snap-fit joining selected in the present invention renders it easier to select the fixture at any desired location, making sure of firm connection of the pinion holder with the cage plate to prevent the pinion holder from taking away from the cage plate. The locating pins and corresponding holes made on the holder halves help make precise snap-fit engagement between the holder halves easier. Squeezing the cage plate between the holder halves can give any interference between the hooked distal and the corresponding recess of the holder halves to protect the holder halves against taking apart from one another. Raised portions above the holder halves in which their mating surfaces are staggered each other help the holder halves protect against separating from one another even if any external force is exerted to the pinion holder.

Other aspects, objects and advantages of the present invention can be obtained from a study of the drawings, the disclosure and the appended claims.

DETAILED DESCRIPTION OF THE INVENTION

A finite linear motion guide unit constructed according to the present invention is provided therein with a rack-and-pinion arrangement to keep a cage against wandering. More particular, the present invention is intended to improve the means to keep the cage against wandering to render it suitable for use in the finite linear motion guide unit that is very larger in dimension than once expected in the finite linear motion guide unit disclosed in the Japanese Patent Laid-Open No. 2004-197850 recited earlier. To this end, the finite linear motion guide unit features the pinion bearing arrangement made sturdy enough to allow the use of finite linear motion guide units in bulky machines.

The finite linear motion guide unit discussed later is adapted for use in a variety of machinery including semiconductor manufacturing machines, precision measuring machines, precision inspection equipment, precision assembly machines, industrial robots, and so on.

Embodiments of a finite linear motion guide unit with means for keeping a cage against wandering according to the present invention will be described in detail with reference to the accompanying drawings.

Figure 1:
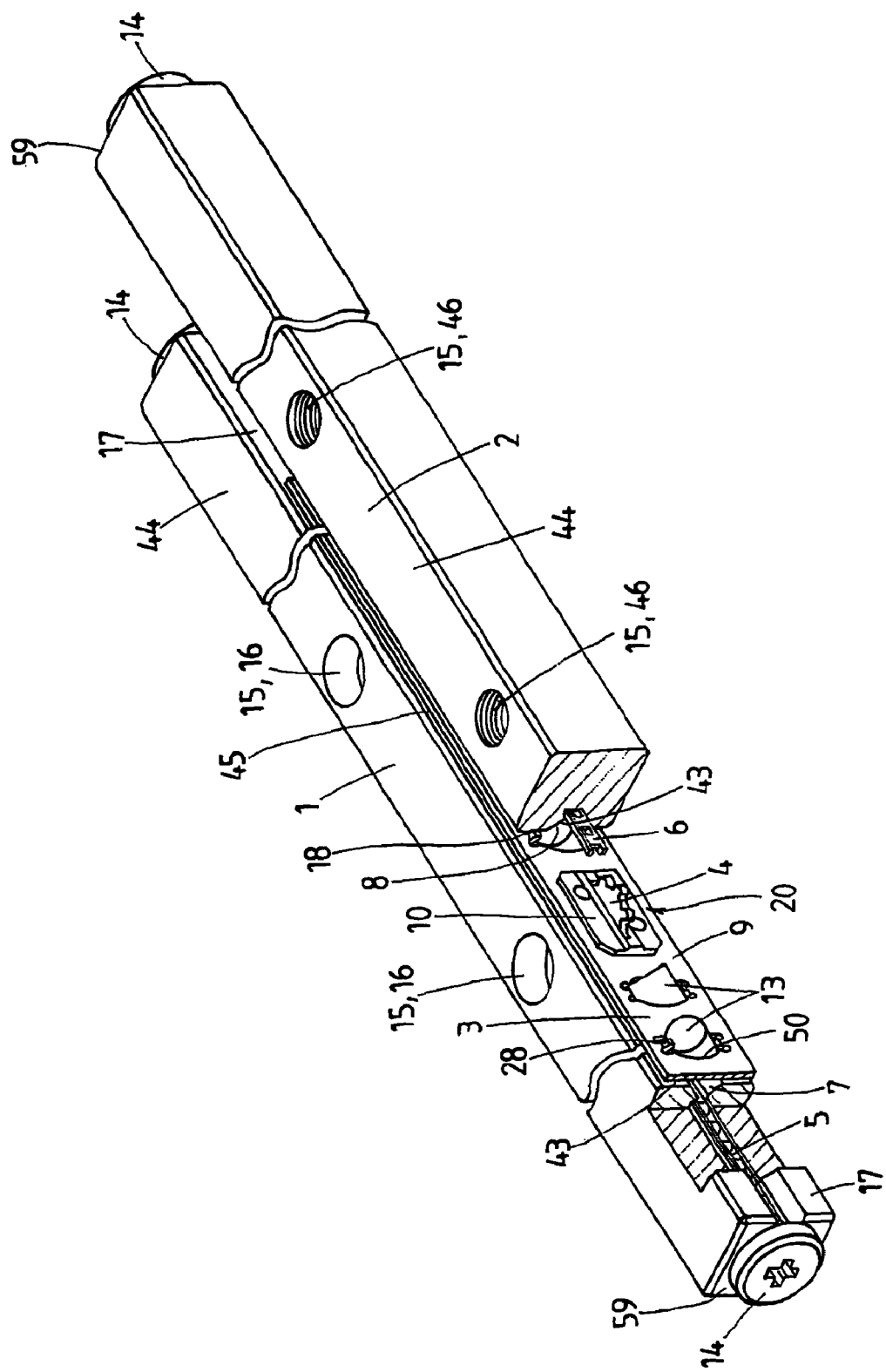
FIG. 1 is a perspective view, partially broken away, showing a preferred embodiment of a finite linear motion guide unit having therein a means for keeping a cage against any wandering according to the present invention.
Figure 2:
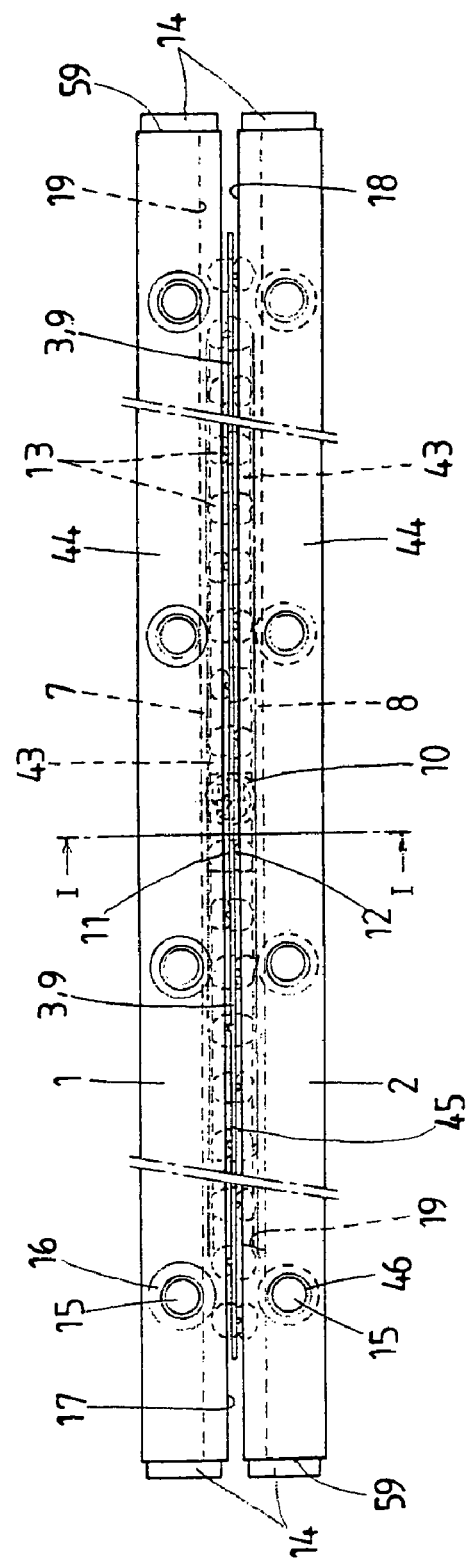
FIG. 2 is a front elevation of the finite linear motion guide unit of FIG. 1.
Figure 3:
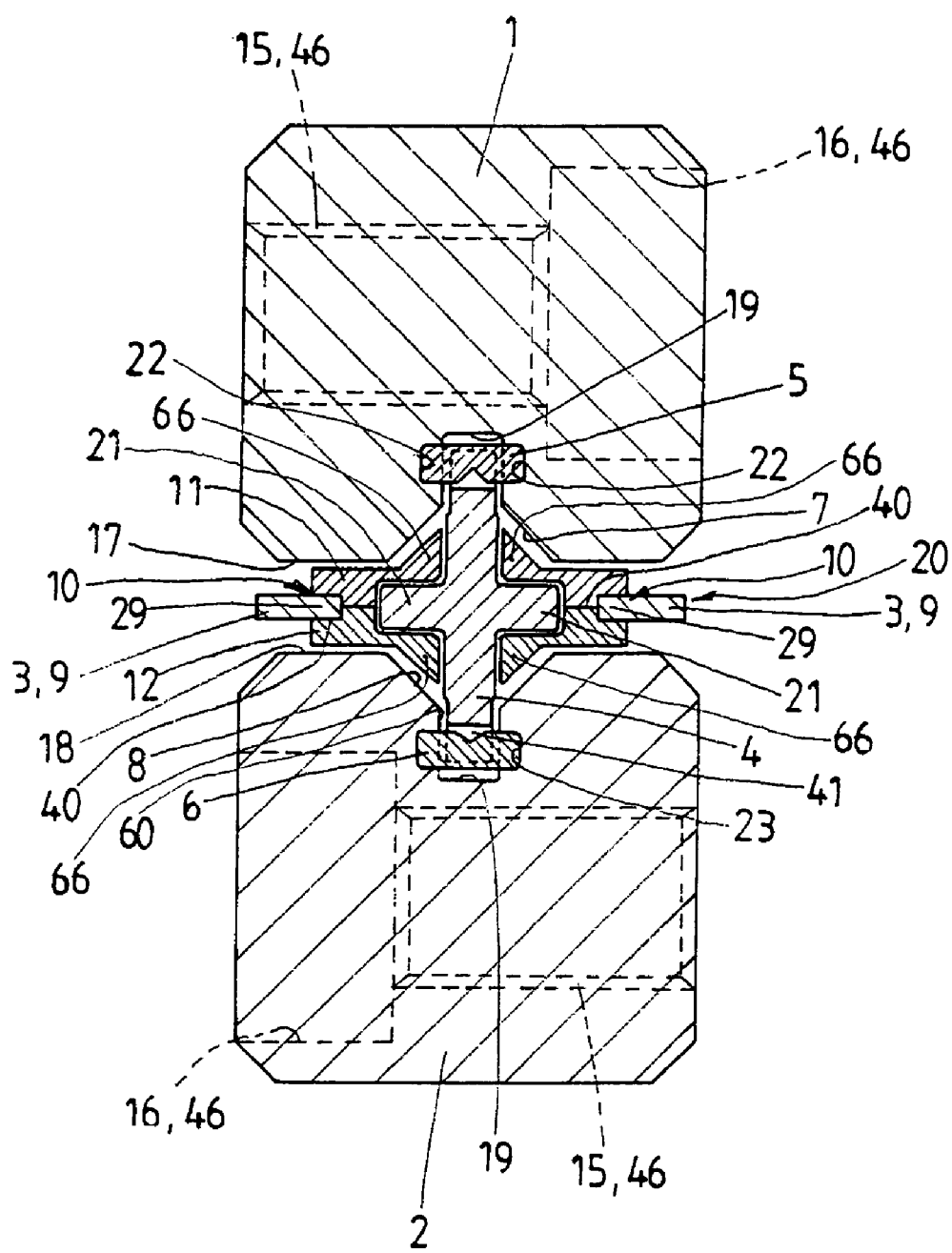
FIG. 3 is a traverse cross section of the finite linear motion guide unit, taken along the plane lying on the line I-I of FIG. 2.
Figure 4:
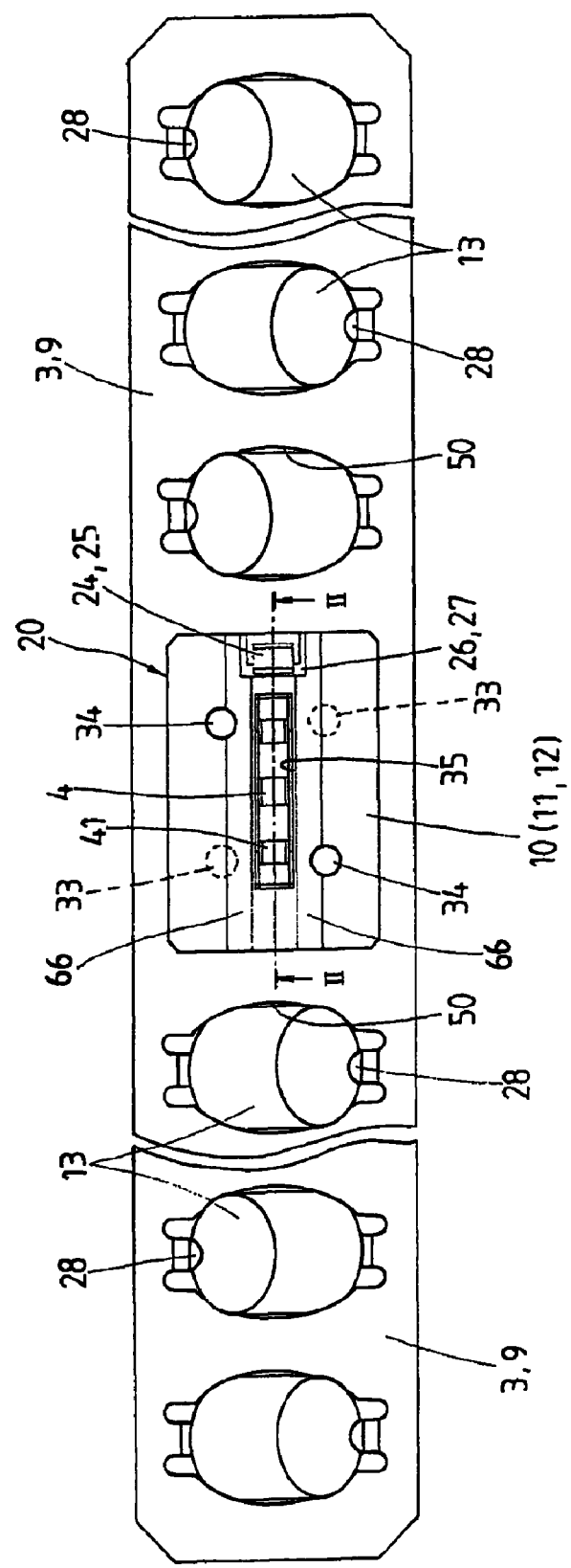
FIG. 4 is a top plan view, partially cut away, showing a cage assembly for the finite linear motion guide unit of FIG. 1.

First of all, a preferred embodiment of the finite linear motion guide unit of the present invention, as shown in FIGS. 1 to 3, includes guideway members 1 and 2, more than one roller 13 of rolling element lying between the guideway members 1 and 2, a cage assembly 3 to hold the roller 13 in place, and a means 20 to keep the cage assembly 3 against wandering, the means 20 being comprised of a rack-pinion arrangement made up of racks 5 and 6 installed in the guideway members 1 and 2, and a pinion 4 coming into mesh with the racks 5 and 6. With the finite linear motion guide unit constructed as stated earlier, while the guideway members 1 and 2 are allowed to move relatively to one another by virtue of the roller 13, the cage assembly 3 holding the roller 13 between raceway grooves 43 travels over a distance of stroke half the relatively moving stroke of the guideway members 1 and 2.

The finite linear motion guide unit of the sort discussed here are likely to be off in increments in relative position between the guideway members 1 and 2, depending on some situations including any variations of the load exerted on the guideway members 1 and 2, the accuracy of raceways 7, 8 finished on the raceway grooves 43, whether it operates in vertical posture or in other postures, the operating velocity and acceleration/deceleration, and so on. To cope with the issue stated earlier, the rack-pinion arrangement made up of the racks 5 and the pinion 4 is installed in the cage 3 to work as the means 20 to keep the cage assembly 3 against any wandering that would get the guideway members 1 and 2 moving past each other in position. The guideway members 1, 2 are each provided at forward and aft ends thereof with an end screw 14 having a stopper head to limit the length of stroke to keep the cage assembly 3 from escape out of the associated guideway member 1, 2.

The guideway members 1 and 2 are made rectangular in transverse section and have the raceway grooves 43 extending lengthwise on their sides 17 and 18 lying in opposition to each other. The raceway grooves 43 are each made V-shaped in cross section to make a pair of raceways 7 and 8 that extend in parallel with one another on opposite sides of a relief valley 19 cut deep along a lengthwise bottom of the associated raceway groove 43. The cage assembly 3 is comprised of a rectangular cage plate 9, which is laid between the guideway members 1 and 2 and made therein with a series of pockets 50 that are arranged at preselected intervals in the longitudinal direction of the cage plate 9. Many cylindrical rollers 13 are installed in the cage plate 9 in a fashion tilting 45 degrees with respect to the side or plane 42 of the cage plate 9 and also any two adjoining rollers 13 intersecting with one another. That is, the cylindrical rollers 13 are held in the cage plate 9 with fingers 28 formed above the sides of the cage plate 9 in such geometry that their own axes intersect alternately in perpendicular to one another.

On lengthwise upper and lower surfaces 44 extending in perpendicular to the sides 17, 18 of the guideway members 1, 2 having the raceway grooves 43 thereon, there are made some-bolt holes 15 that are positioned lengthwise at preselected intervals to be used to fasten the guideway members 1, 2 to any components or counterparts such as a machine bed, not shown. The bolt holes 15 include some holes 16 countersunk to conceal the bolt heads and other holes 46 having internal threads that fit over the associated bolts driven from the side of the counterparts. The racks 5 and 6 are placed in the relief valleys 19 lying along the raceways 43 on the guideway members 1 and 2, one to each valley 19, and fit into slots 22 and 23, which are cut sideward into lengthwise sides 60 defining the relief valleys 19. Although but the racks 5 and 6 may be made to extend across most of the overall length of the guideway members 1 and 2, they may be sufficient to have the length enough to cover at least only the working range of the guideway members 1 and 2. The racks 5 and 6 are installed in the associated slots 22 and 23 through their ingresses opened in ends 59 of the guideway members 1 and 2. The pinion 4 to constitute the means 20 to keep the cage 3 against wandering is installed for rotation in the pinion holder 10 to mesh the paired racks 5 and 6. With the embodiment illustrated, only one pinion 4 is placed in the middle of the cage assembly 3, which is recommended in light of ensuring load balance, distance of stroke, and so on. In some designs, however, the pinion 4 may be set in any desired location of the pinion holder and also more than one pinion 4 can be used.

The finite linear motion guide unit of the present invention especially has distinctive features in the construction of the pinion holder 10 as shown in FIGS. 4 to 12, compared with the conventional finite linear motion guide units.

The means 20 to keep the cage assembly 3 against wandering is comprised of the pinion holder 10 that fits in a window 30 cut in the cage plate 9 of the cage assembly 3, the racks 5 and 6 laid below the sides 17 and 18 of the guideway members 1 and 2, and the pinion or small gear 41 installed in the pinion holder 10 and provided thereon with teeth that mesh with teeth on the racks 5 and 6.

Figure 5:
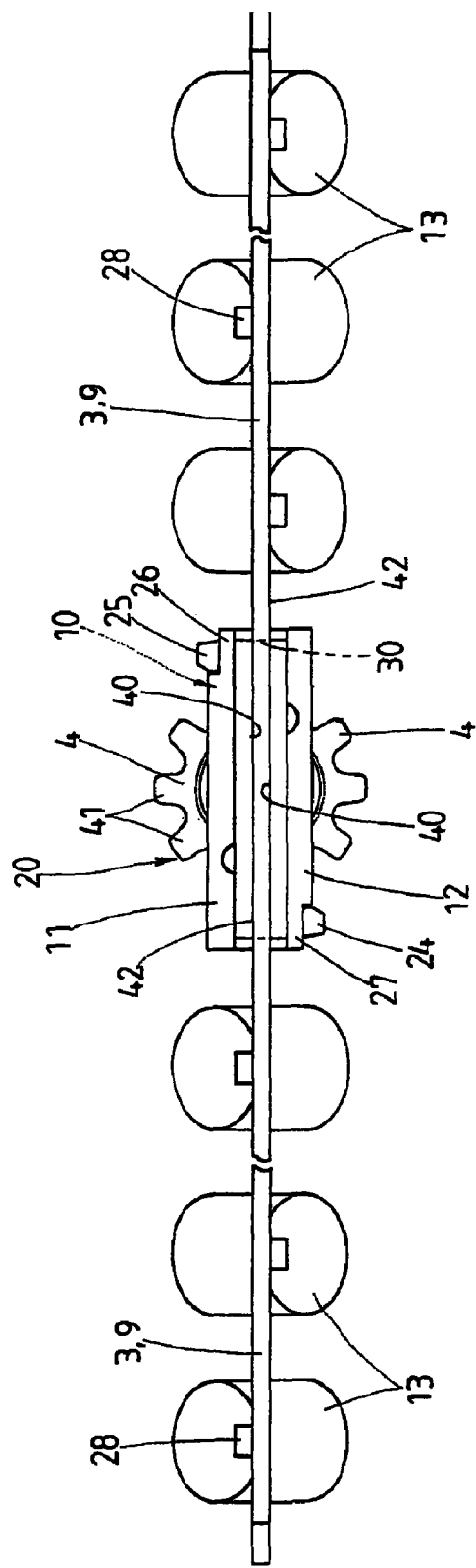
FIG. 5 is a front elevation of the cage assembly of FIG. 4.
Figure 6:
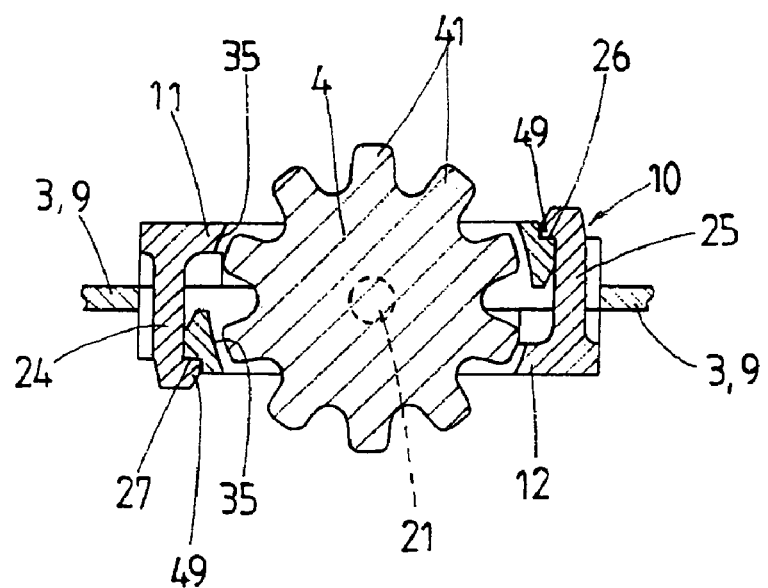
FIG. 6 is a fragmentary view in section of the pinion holder, the view being taken along an area corresponding to the plane lying on the line II-II of FIG. 4.
Figure 7:
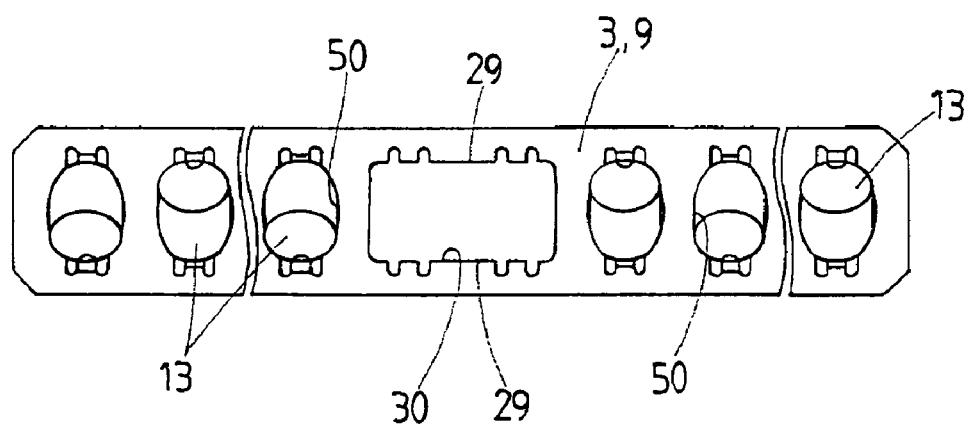
FIG. 7 is a top plan view of the cage assembly of FIG. 4, but the pinion holder being shown removed from there.
Figure 8:
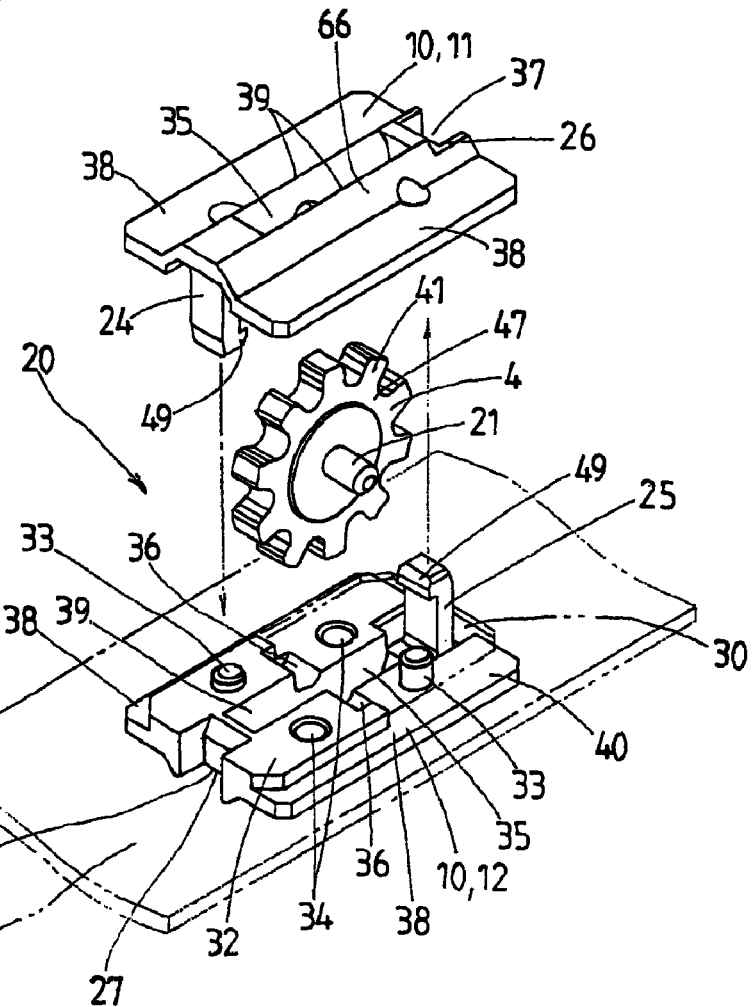
FIG. 8 is an exploded view in perspective of a means for keeping the cage against wandering to be installed in the finite linear motion guide unit of FIG. 1.
Figure 9:
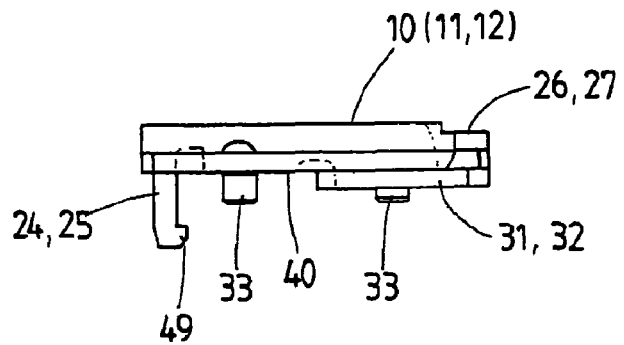
FIG. 9 is a front elevation of any one of pinion holder halves in the means for keeping the cage against wandering in FIG. 8.
Figure 10:
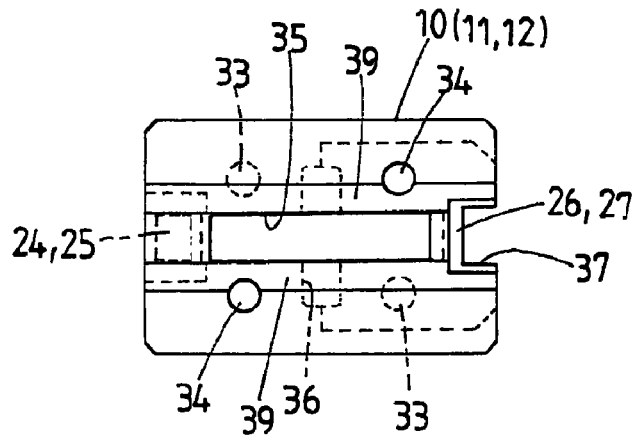
FIG. 10 is a top plan view of the pinion holder half of FIG. 9.
Figure 11:
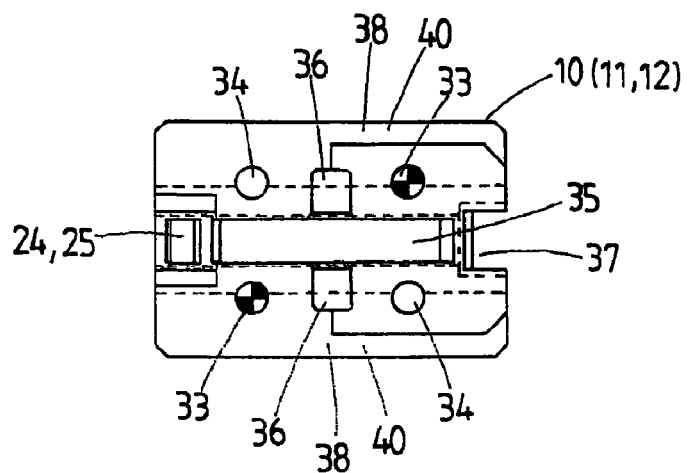
FIG. 11 is a bottom plan view of the pinion holder half of FIG. 9.
Figure 12:
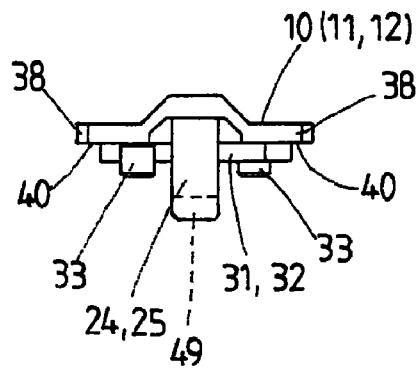
FIG. 12 is a side view in elevation of the pinion holder half of FIG. 9.

The pinion holder 10, as shown in FIG. 5, is made up of a first holder half part 11 coming into abutment against any one side 42 of the cage plate 9 around the window 30, and a second holder half part 12 coming into abutment against the other side 42 of the cage plate 9 in opposition to the first holder part 11. The first and second holder parts 11 and 12 have widthwise extensions 38 lying along lengthwise both side edges of the holder half parts to squeeze the cage plate 9 along a marginal region 29 around the window 30 to hold securely in place the first and second holder parts 11 and 12. Thus, the pinion holder 10 can fit snugly and securely over the pinion 4 for rotation with leaving a play as less as possible.

With the pinion holder 10 constructed as stated earlier, a pair of the holder halves 11 and 12 is made to retain securely the cage plate 9 between them. The holder halves 11 and 12 have mating surfaces 40 that are made same in shape to be complementary to each other. The holder halves 11 and 12 are made substantially rectangular in the overall configuration at whose widthwise middle area there is provided slender openings 35 to accommodate therein the pinion 4 of a circular disc with successive teeth 41 around there. Upon completing the cage assembly 3, the holder halves 11 and 12 together with the pinion 4 fitted in the openings 35 are brought into the window 30 in the cage plate 9 for the cage assembly 3 in opposition to one another, and then snapped engaged together to hold the cage plate 9 between them.

The holder halves 11 and 12 are raised at 66 in the lengthwise direction of the openings 35 to render lengthwise sides 39 of the openings 35 larger in height over their overall lengths to make sliding-contact with major radial areas of axially opposite circular surfaces 47 of the pinion 4, keeping securely the pinion 4 against wobbling. On the mating surfaces 40 of the holder halves 11 and 12, moreover, there are provided bulged portions 31 and 32 that are made in a contour adapted to fit snugly into the window 30 cut in the cage plate 9. The inward surfaces of the holder halves 11 and 12 confronting one another provide the mating surfaces 40 for the widthwise extensions 38 lying along lengthwise both side edges of the holder halves to come into engagement with the marginal edges 29 around the window 30 to thereby squeeze the cage plate 3 between them. Thus, the mating surfaces 40 are partially raised above the mating surfaces 40 at areas exposed to each other through the window 30 to form the bulged portions 31 and 32 that are allowed to fit snugly into the window 30 in the cage plate 9. The bulged portions 31 and 32 are each made in dimension to make up a half the window 30 in the lengthwise direction thereof in a way any one of the bulged portions 31 and 32 accounts for any lengthwise half area of the window 30 while another bulged portion 31 or 32 accounts for the rest of the window 30. With the bulged portion 31 and 32 in the holder halves 11 and 12 constructed as stated earlier, moreover, any one of the bulged portion 31 and 32 is made somewhat less in height than a thickness of the cage plate 9 and placed in opposition to corresponding parts in the mating surfaces of the sidewise extensions 38 on the counterpart or other holder half halves 12 or 11 where the corresponding parts have no bulged portion to be coplanar with other mating surfaces.

The mating surfaces 40 of the holder halves 11 and 12 are recessed at their lengthwise middle of the slender opening 35 to provide bearing halves 36 lying across the slender opening 35 to complete bearings in which a pinion shaft 21 of the pinion 4 is carried securely for rotation. For joining the holder halves 31 and 32 together to embrace snugly the pinion shaft 21 between the bearing halves 36 with accuracy, the holder halves 11 and 12 each have two locating pins 33 on any one diagonal across the associated bearing halves 36 and also have holes 34 located on another diagonal in symmetrical relation with respect to the locating pins 33 over 180 degrees in such a way that the locating pins 33 fit into the holes 34. On any one of forward and aft ends of the holder halves 11 and 12, there are provided latches 24 and 25 that extend beyond the far side 42 of the cage plate 9 and terminate in hooked ends 49. On the other of the lengthwise ends of the holder halves 11 and 12, recesses 37 are made to allow the latches 24 and 25 to extend through there. On the sides 39 defining the slender opening 35 in the holder halves 11 and 12, notches or flat step nosing 26 and 27 are cut in outward surfaces facing the recesses 37 to come into engagement with the associated hooked ends 49 of the latches 24 and 25.

With the pinion holder 10 constructed as stated earlier, the holder halves 11 and 12 identical in shape with one another are assembled together in a way the bulged portions 31 and 32 raised above their mating surfaces 40 come into complement to each other to fit into the window 30 in the cage plate 9. The window 30 cut in the cage plate 9 is made in a rectangular contour of a dimension stretching across two pockets 50 to receive the rollers 13 therein, one to each pocket. In production of the cage plate 9, many pockets 50 are first made throughout the overall length of cage plate 9 at preselected intervals in the longitudinal direction of the cage plate 9, and thereafter the punching operation is performed to remove material of an interval between any two adjoining pockets lying midway between lengthwise ends of the cage plate 9, making the window 30 with a little part leaving of an edge shape of the associated pockets 50.

With the finite linear motion guide unit constructed as stated earlier, the pinion holder 10 can be held firmly in the cage plate 9 while the pinion 4 is carried steadily for rotation between the holder halves 11 and 12 of the pinion holder 10. Thus, the pinion 4 is supported steadily for rotation by the cage plate 9 or the cage 3. It is to be noted that the word "steadily" or "firmly" employed herein refers to the condition that some parts are operatively linked to one another without causing any wobbling or getting jarred, with rigidity or stiffness enough to withstand against large load. With the pinion holder 10 of the present invention, the holder halves 11 and 12 identical in construction with each other are combined together with the snap-fit fasteners. This constructional feature results in a reduction in number of required parts for the pinion holder 10 compared the conventional ones. The pinion holder 10 can be made simple in construction and inexpensive in production cost, making it easier to provide the means 20 to keep the cage against wandering, which is compact in construction and universal in applications.

Although the finite linear motion guide unit of the present invention has been stated earlier in its preferred embodiment in which the rack-and-pinion arrangement is placed inside the races, it will be understood that the rack-and-pinion arrangement can be installed in any location other than the races inside the guideway members 1 and 2 because the pinion holder 10 may be installed in any arbitrary location so long as the cage 3 is allowed cutting therein the window 30 to fit over the pinion holder 10. Having described the present invention as related to the embodiment in which the guideway members 1 and 2 are identical in construction, moreover, it is believed obvious that the guideway members are made different in length from one another and applied to other types of the finite linear motion guide unit. It is further understood to those skilled in the art that the rolling elements are not limited to the cylindrical rollers 13 as in the embodiment stated earlier, but may be made of balls.

What is claimed is:

1. A linear motion guide unit comprising:
    a pair of guideway members lying movable relatively to one another and having confronting raceway grooves on their sides extending in lengthwise direction,
    a cage made of a cage plate having a flat shape and extending in the lengthwise direction to retain more than one rolling element in a raceway defined between the raceway grooves on the guideway members, the cage plate comprising a rectangular contour window cut therein,
    a rack-and-pinion arrangement provided in the cage which keeps the cage from wandering, the rack-and-pinion arrangement comprises:
        a pinion holder fitting into the window cut in the cage plate,
        racks lying on the guideway members, one rack connected to each guideway member, and
        a pinion provided with teeth mating with the racks and installed in the pinion holder for rotation; and wherein the pinion holder is made up of a first holder half part coming into abutment against one side of the cage plate around the window, and a second holder half part coming into abutment against the other side of the cage plate around the window snap-fit fasteners provided on the first and second holder half parts configured to join together the first and second holder half parts to one another through the window, wherein each of the first and second holder half parts comprise extensions extending outwardly and lying along lengthwise side edges of the first and second holder half parts to squeeze edges of the cage plate on two sides of the window between the first and second holder half parts to retain the cage plate between the first and second holder half parts; and wherein the snap-fit fasteners comprise a latch and a recess at lengthwise opposite ends of each of the first and second holder half parts, so that one latch of one half part is allowed to snap into the corresponding recess of another half part to make a snap-fit connection between the holder half parts.

2. A linear motion guide unit constructed as defined in claim 1, wherein the first and second holder half parts are made identical with one another in shape, but combined together in lengthwise opposite direction to one another.

3. A linear motion guide unit constructed as defined in claim 1, wherein the first and second holder half parts each have an opening of rectangular shape to fit the pinion therein.

4. A linear motion guide unit constructed as defined in claim 1, wherein the pinion has a pinion shaft that is carried for rotation in bearing portions recessed in the first and second holder half parts.

5. A linear motion guide unit constructed as defined in claim 1, wherein the first and second holder half parts are each made with a raised portion of a contour configured to fit snugly into the window cut in the cage plate.

6. A linear motion guide unit constructed as defined in claim 1, wherein one of the first and second holder half parts has a locating pin while the other has a hole configured to fit over the locating pin.

* * * * *